United States Patent Office
3,441,085
Patented Apr. 29, 1969

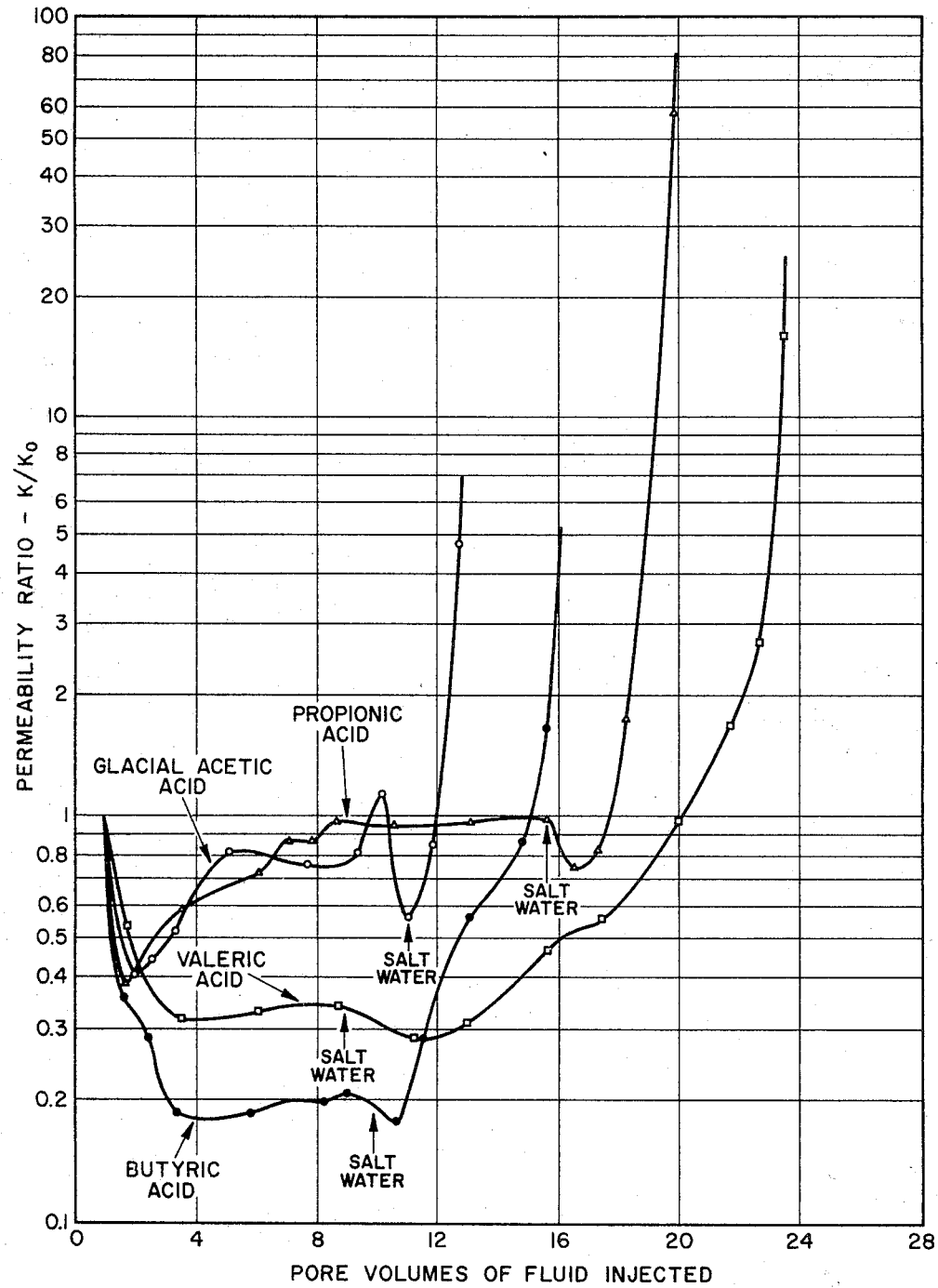

3,441,085
METHOD FOR ACID TREATING CARBONATE FORMATIONS
John L. Gidley, Houston, Tex., assignor to Esso Production Research Company, a corporation of Delaware
Filed Sept. 7, 1967, Ser. No. 666,160
Int. Cl. E21b 43/27
U.S. Cl. 166—307       16 Claims

ABSTRACT OF THE DISCLOSURE

A method for the acid treatment of a carbonate formation surrounding a wellbore wherein an organic acid or an organic acid solution having a concentration in excess of that necessary to form a saturated salt solution on reaction with the carbonate rock is injected into the formation and water is thereafter injected to solubilize the acid salts.

BACKGROUND OF THE INVENTION

Field of the invention

This invention relates to the acid treatment of carbonate formations surrounding oil wells, gas wells, water wells and similar boreholes.

Description of the prior art

Acid treating has been widely used for improving the permeability of carbonate formations surrounding oil wells, gas wells and similar boreholes. Studies have shown that conventional methods utilizing hydrochloric acid solutions are often unsuccessful because of the high reaction rate of the acid with calcium carbonate, magnesium carbonate and similar materials. The rate at which the acid is neutralized as it comes in contact with such materials often exceeds the rate at which the solution can be forced into the formation and hence the acid which contacts the rock at points more than a few inches from the wellbore is essentially spent. The use of chemically retarded acids and solutions of weak organic acids which have low dissociation constants and therefore react more slowly than hydrochloric acid give somewhat better results than the older methods but experience has shown that in many cases only limited penetration is obtained. For this reason, fracturing and other stimulation methods have largely replaced acid treating in many areas.

SUMMARY OF THE INVENTION

This invention provides an improved method for the acid treatment of carbonate formations which permits greater penetration than has generally been obtained heretofore. In accordance with the invention, it has now been found that the injection into a carbonate formation of a low molecular weight organic acid or an organic acid solution having a concentration in excess of that required for the formation of a saturated salt solution on reaction with the carbonate rock and the subsequent injection of water or brine to solubilize the precipitated acid salts permits penetration of the acid into sections of the formation not normally reached during conventional acid treating operations. This makes possible substantial improvements in permeability at considerable distances from the wellbore and often permits increased prdouction from formations which do not respond to conventional acid treating methods.

The mechanisms responsible for the improved results obtained in accordance with the invention are not fully understood. Laboratory tests indicate, however, that the organic salts precipitated as the acid reacts with the carbonate rock shield the rock surfaces from further acid attack. This precludes complete reaction of the acid in the vicinity of the wellbore and permits unspent acid to penetrate more deeply into the formation. Only a small portion of the injected acid is consumed near the wellbore. The water or brine subsequently injected solubilizes the previously insoluble reaction products and provides the desired permeability improvement. It also promotes further attack of the rock as the acid concentration declines. Although other phenomena may also be involved, successful field tests in low permeability carbonate reservoirs which do not ordinarily respond to conventional acid treating methods indicate that these mechanisms play important roles.

BRIEF DESCRIPTION OF THE DRAWING

The drawing is a plot showing the effect of various organic acids on the permeability of limestone when used in accordance with the invention.

DESCRIPTION OF THE PREFERRED EMBODIMENT

The low molecular weight organic acids utilized for purposes of the invention are aliphatic carboxylic acids containing from 2 to about 6 carbon atoms per molecule. Examples of such acids include acetic acid, propionic acid, butyric acid, isobutyric acid, valeric acid, caproic acid, hydroxyacetic acid, chloroacetic acid, chloropropionic acid, dichloroacetic acid, pyruvic acid, malic acid, lactic acid, maleic acid, oxalic acid, malonic acid, succinic acid, adipic acid, citric acid and the like. Mixtures of these and similar acids and the anhydrides of such acids can also be used. The saturated fatty acids containing from 2 to about 4 carbon atoms per molecule are generally preferred. Propionic acid has been found to be particularly effective for purposes of the invention.

Anhydrous acids, acid anhydrides, or solutions of the organic acids having concentrations in excess of those necessary to form saturated salt solutions on reaction of the acids with the carbonate rock are utilized in carrying out the invention. The acid concentrations necessary to precipitate salts of the organic acids will depend in part on the composition of the carbonate rock to be treated and the particular acid or mixture of acids selected. Most oil-bearing carbonate formations consist primarily of calcium carbonate or mixtures of calcium and magnesium carbonates and hence the solubilities of the calcium salts normally determine the concentrations in which the acids must be used. Studies have shown that dilution of the injected acid or acid solution by connate water in the pore spaces of the formation tends to retard precipitation of the calcium salts and necessitates the use of higher acid concentrations than would otherwise be required. In order to compensate for this dilution and obtain precipitation of the salts at substantial distances from the wellbore, the solutions employed will normally have acid concentrations in excess of about 50 percent by weight. The use of solutions having concentrations of about 85 percent by weight or higher is preferred. Substantially anhydrous acids are particularly effective.

In addition to the low molecular weight organic acids, the acid solutions employed for purposes of the invention may contain corrosion inhibitors, demulsifiers, surface tension reducing agents, chemical retarding agents, clay stabilizers, and other additives. A variety of different additive agents designed to improve acid performance during well treating operations, have been suggested in the prior art and may be utilized if desired.

The quantities in which the acid solutions are used will depend in part upon the thickness of the formation to be treated but should be sufficient to permit penetration a substantial distance into the formation. In general, the quantities employed will range between about 50 and about 1000 gallons of acid solution per foot of formation thickness. The use of from about 100 to about 300 gallons per foot is normally preferred. From about 1 to about 10 volumes of water or brine per volume of acid solution will normally be injected following the acid. In the case of water injection wells, however, the regular injection of water can be resumed after introduction of the acid and hence separate injection of water or brine is unnecessary.

In carrying out the invention, the acid or acid solution can be pumped directly into the well, displacing fluids present in the tubing and wellbore into the formation ahead of the treating fluids. Alternatively, the well to be treated may first be killed by injecting lease crude oil or brine in quantities sufficient to prevent the influx of fluids from the producing formation. The sucker rods, pump and associated equipment can then be removed from the well. A scratcher or similar device can be employed for the removal of accumulated wax and other foreign matter from the perforations or face of the formation. A string of tubing provided with a packer may be lowered in the wellbore to a point above the zone to be treated and the well filled with crude oil or brine. The acid or acid solution can then be pumped from a tank truck into the tubing. The fluid present in the tubing and in the wellbore opposite the zone to be treated can be displaced into the formation or conducted around the packer through the annulus to the surface. After the wellbore fluids have been displaced or discharged at the surface, acid injection is continued until the desired volume has been injected into the formation. The acid should normally be injected as rapidly as possible but care should be taken to avoid fracturing the formation.

The acid injected into the formation reacts with the carbonate rock to form salts which precipitate when their solubility limit in the partially spent acid is reached. This precipitation apparently results in partial plugging of the pore spaces and shielding of the exposed surfaces against further acid attack. Although the acid concentration at the leading edge of the injected solution decreases due to reaction with the carbonate and dilution by connate water so that a bank of essentially spent acid is built up, fresh acid solution injected passes through the protected zone with little or no reaction and hence continued injection permits the penetration of unspent acid into remote sections of the formation. Much greater penetration than can normally be secured with dilute acid is obtained.

Following injection of the concentrated acid solution, water or brine is pumped into the formation to solubilize the precipitated acid salts and dilute the unreacted acid remaining in the pore spaces. This precludes further salt precipitation and promotes reaction of the remaining acid. A substantial increase in permeability takes place as the water or brine advances into the formation and the diluted acid reacts with the rock at points not previously attacked by the concentrated solution. A more uniform attack of the formation than took place during injection of the concentrated solution is obtained.

The well may be shut in and allowed to stand after the water or brine has been injected if desired. The shut in period may range from a few minutes to several days. During this period, the pressures in the formation tend to equalize and further acid attack may occur as the fluids move in response to pressure changes. The well is then returned to production. Swabbing tools may be utilized to promote flow of the injected fluids back into the wellbore or the pump may be reinstalled immediately. It should be understood that the method of the invention is not restricted to pumping wells and can also be used for increasing permeability in the vicinity of flowing oil wells, gas wells, water wells and fluid injection wells.

The nature and object of the invention are further illustrated by the following examples.

EXAMPLE I

In the first of a series of laboratory tests, a substantially anhydrous propionic acid containing about 99.5 percent acid by weight was injected into a core of Indiana limestone one inch in diameter and 2.4 inches long. The core employed had been evacuated and then saturated with a 3 percent sodium chloride solution by pumping the salt water through it until no further change in permeability could be detected. The propionic acid was injected at the same rate used in saturating the core with salt water. The pressure drop across the core was measured and the effluent was sampled periodically. It was found that the pressure drop increased rapidly following introduction of the acid and reached a value of about 120 pounds per square inch after about three pore volumes had been injected, compared with a value of about 40 pounds per square inch during injection of the salt water. The viscosities of the salt water and acid solution were almost identical and hence about a three-fold drop in permeability occurred during injection of the first three pore volumes of acid solution. Substantial plugging of the pore spaces thus took place, apparently due to the precipitation of salts formed as the acid reacted with the carbonate rock.

The injection of concentrated acid was continued at the same rate until an additional three pore volumes had been injected. The pressure drop gradually decreased, apparently because not all of the precipitated salts adhered to the formation. Some redistribution of the precipitated material evidently took place as injection continued. Thereafter, the injection rate was increased by a factor of ten. The pressure drop through the core raipdly increased to about 180 pounds per square inch and remained essentially constant during the injection of an additional nine pore volumes of acid. Samples of the effluent from the core during this period showed an acid concentration of about 98 percent by weight, indicating that the injected acid was not reacting with the carbonate rock to any significant extent. An equilibrium state in which the acid salts shielded the rock from further attack had apparently been reached.

Following the injection of about nine pore volumes of the concentrated acid at the high rate, the injection of acid was discontinued and a 3 percent solution of sodium chloride was introduced into the core at the same rate. Injection of the salt water initially produced no change in the pressure drop across the core. Again the viscosities of the acid solution and the salt water were essentially the same. After about one pore volume of salt water had been injected, the pressure drop began to decline rapidly. After two pore volumes of salt water had been introduced, the drop in pressure had decreasd from 180 pounds per square inch to seven pounds per square inch. Thereafter, it dropped below a measurable value. This reduction in pressure drop indicates that a marked increase in the permeability of the core took place following introduction of the salt water. The brine apparently solubilized the previously precipitated material and diluted the acid remaining so that further acid attack took place.

EXAMPLE II

Further laboratory tests similar to those referred to above were carried out with acetic acid, propionic acid, butyric acid, and valeric acid. In these later tests, the various acids were used in concentrations of from 98 to about 99.5 percent by weight. The acids were injected into limestone cores previously saturated with a 3 percent sodium chloride solution until ten pore volumes or more of acid had been injected. Salt water containing 3 percent sodium chloride was then introduced. The ratio of the permeability during injection of the acid or salt water to the initial permeability, based on pressure measurements, was determined periodically during each test. The results obtained are shown in the drawing. It will be noted that in each case the permeability dropped following introduction of the acid solution and then reached an equilibrium value which persists as long as the injection of acid continued. In some cases more time was required to reach this equilibrium value than in others. On introduction of the salt water, the permeability generally decreased somewhat initially, apparently due to the entrainment of partially solubilized salts in the brine, and then increased very rapidly. Comparable results have been obtained in other tests.

EXAMPLE III

Following the laboratory tests, a field test utilizing concentrated propionic acid was carried out. The well selected was a flowing oil well producing from a limestone formation through perforations in the interval between 10,926 feet and 10,930 feet. Prior to the tests, the well was producing 31 barrels of oil per day with 10 percent water at a tubing pressure of 100 pounds per square inch gauge. The gas to oil ratio was 8800 standard cubic feet per barrel. The temperature of the producing formation was 278° F. This particular well had been treated with 2000 gallons of 15 percent hydrochloric acid about five and one-half years before the field test. A second treatment utilizing 5,000 gallons of 15 percent hydrochloric acid had been carried out about two years before the field test utilizing propionic acid. The second treatment with hydrochloric acid had essentially no effect on the production of oil from the well.

The acid solution employed in carrying out the propionic acid treatment was a solution containing about 99.5 percent propionic acid by weight. The test was carried out by injecting the acid through the tubing string and displacing the fluids initially present in the wellbore into the formation ahead of it. The injection rate was well below that required to fracture the limestone. A total of 1,000 gallons of acid was injected. During injection, the pressure increased continuously. Following this, 3,000 gallons of 3 percent salt water was pumped into the formation. The bottom hole pressure initially increased following introduction of the salt water and then gradually decreased. The well was shut in following injection of the brine and allowed to stand overnight. The following day the well was swabbed and production was then resumed. The history of the well before and after the propionic acid treatment is shown in the following table.

| Operation | | Choke size, in. | Tubing pressure, p.s.i.g. | Production, BOPD | Water, percent | GOR, s.c.f./bbl. |
|---|---|---|---|---|---|---|
| Before treatment: | | | | | | |
| 5½ yrs | 2,000 gallons HCl | | | | | |
| 5½ yrs | Flowing | | 2,500 | 92 | 0 | 15,000 |
| 23 mos | do | | 450 | 32 | 10 | 7,500 |
| 22 mos | 5,000 gallons HCl | | | | | |
| 22 mos | Flowing | | 275 | 31 | 10 | 14,000 |
| 3 mos | do | | 100 | 30 | 9 | 11,300 |
| 14 days | do | 40/64 | 100 | 31 | 10 | 8,796 |
| 13 days | do | 40/64 | 100 | 24 | 10 | 11,490 |
| 12 days | do | 40/64 | 100 | 25 | 10 | 11,315 |
| | 1,000 gal. propionic acid, 3,000 gal. 3% salt water | | | | | |
| Days after treatment: | | | | | | |
| 1 | Swabbing | | | | | |
| 2 | Flowing | 18/64 | 275 | 49 | 20 | 6,000 |
| 3 | do | 18/64 | 275 | 57 | 20 | 7,300 |
| 4 | do | 14/64 | 325 | 62 | 20 | 4,700 |
| 5 | do | 14/64 | 350 | 46 | 20 | 6,400 |
| 6 | do | 14/64 | 325 | 51 | 20 | 5,570 |
| 7 | do | 20/64 | 175 | 89 | 20 | 3,420 |

It can be seen that the treatment with concentrated propionic acid followed with salt water produced a substantial increase in oil production. Despite the use of a much smaller choke after the treatment, the production rate increased from 25 barrels of oil per day before the treatment to 89 barrels per day a week after the treatment. The tubing pressure increased from 100 pounds per square inch gauge to 175 pounds per square inch gauge and the gas-oil ratio decreased from about 11,000 standard cubic feet per barrel to about 3500 standard cubic feet per barrel. The earlier treatment with hydrochloric acid, on the other hand, had essentially no effect on oil production and was accompanied by an increase in the gas-oil ratio. It is therefore apparent that the method of the invention is considerably more effective than conventional methods utilizing hydrochloric acid.

EXAMPLE IV

A second field test was carried out in a well completed in a limestone formation with perforations in the interval between 10,948 and 10,954 feet. The well was producing about 21 barrels of oil per day with a tubing pressure of 150 pounds per square inch prior to the treatment. The produced fluids contained 65 percent water and the gas-oil ratio was about 7,500 standard cubic feet per barrel. The formation temperature was 300° F. Following treatment of the well with 1,000 gallons of 99.5 percent propionic acid and 3,000 gallons of 3 percent sodium chloride solution, the test results set forth in the following table were obtained.

| Operation | | Choke size, inc. | Tubing pressure, p.s.i.g. | Production, BOPD | Water, percent | GOR, s.c.f./bbl. |
|---|---|---|---|---|---|---|
| Before treatment: | | | | | | |
| 6 years | 250 gallons HCl | | | | | |
| Do | Flowing | 16/64 | 1,000 | 120 | 20 | 6,700 |
| 14 days | do | 15/64 | 150 | 30 | 65 | 5,466 |
| 13 days | do | 15/64 | 125 | 22 | 65 | 6,458 |
| 12 days | do | 15/64 | 125 | 21 | 65 | 7,072 |
| | 1,000 gal. propionic acid, 3,000 gal. 3% salt water | | | | | |
| Days after treatment: | | | | | | |
| 1 | Swabbing | | | | | |
| 2 | Flowing | 18/64 | 1,100 | 112 | 60 | 10,230 |
| 3 | do | 18/64 | 1,175 | 151 | 60 | 8,304 |
| 4 | do | 18/64 | 1,250 | 146 | 65 | 8,850 |
| 5 | do | 14/64 | 1,325 | 122 | 65 | 10,600 |
| 6 | do | 14/64 | 1,325 | 140 | 60 | 9,200 |
| 7 | do | 10/64 | 1,750 | 56 | 60 | 16,050 |
| 8 | do | 7/64 | 2,175 | 46 | 45 | 19,000 |

The data set forth above show that the treated well was capable of producing at a higher rate than it was on original completion following hydrochloric acid stimulation, despite the reduction in reservoir pressure which had taken place during the six-year life of the well. The production figures show, with chokes of about the same size, an increase of over sixfold in response to the treatment. An increase in the tubing pressure of over ten-fold, with about the same choke size, was obtained. Such results indicate that substantially greater penetration of the acid was obtained than is normally the case in conventional acid treating operations.

EXAMPLE V

In still another field test, propionic acid having a concentration of 99.5 percent by weight and salt water were used to treat a well completed in a limestone formation with perforations in the interval between 7,359 and 7,366 feet. This was a pumping well in which the production was rapidly declining. The treatment involved the injection of 1,000 gallons of propionic acid and the subsequent introduction of 3,000 gallons of a 3 percent sodium chloride solution. The production data before and after the treatment are set forth below.

| Operation | Pump data | Total fluid production, BFD | Oil production, BOPD | Water, percent | GOR s.c.f./bbl. |
|---|---|---|---|---|---|
| Before treatment: | | | | | |
| 3½ mos... Pumping | | 50 | 19 | 62 | 1,950 |
| 4 days...do... | 1¼" pump, 42" stroke, 18 s.p.m. | 15 | 4.6 | 70 | 1,860 |
| 3 days...do... | | 7 | 2.1 | 70 | 4,300 |
| | 1,000 gal. propionic acid, 3,000 gal. 3% salt water | | | | |
| Days after treatment: | | | | | |
| 1... Installing pump | | | | | |
| 2... Installing pump, preparing to test. | | | | | |
| 3... Pumping | | 280 | 85 | 70 | |
| 4...do... | | 230 | 69 | 70 | |
| 5...do... | | 186 | 41 | 78 | |
| 6...do... | | 182 | 42 | 77 | 1,975 |

Again it will be noted that a marked improvement in production was obtained. Just before the treatment, the well produced 2.1 barrels of oil per day. Following treatment, production stabilized at 42 barrels of oil per day, a twenty-fold increase.

What is claimed is:

1. A method for treating a subterranean carbonate formation penetrated by a wellbore which comprises injecting into said formation a treating agent selected from the group consisting of substantially anhydrous aliphatic carboxylic acids containing from 2 to about 6 carbon atoms per molecule, anhydrides of aliphataic carboxylic acids containing from 2 to about 6 carbon atoms per molecule, and aqueous solutions of aliphatic carboxylic acids containing from 2 to about 6 carbon atoms per molecule having acid concentrations in excess of about 50 percent by weight, said treating agent being injected in a volume sufficient to penetrate a substantial distance into said formation, and thereafter injecting water into said formation behind said treating agent.

2. A method as defined by claim 1 wherein from about 50 to about 1000 gallons of said treating agent is injected per foot of formation thickness.

3. A method as defined by claim 1 wherein said treating agent is substantially anhydrous propionic acid.

4. A method as defined by claim 1 wherein said treating agent is an aqueous solution of an aliphatic carboxylic acid containing from 2 to 4 carbon atoms per molecule having an acid concentration in excess of about 85 percent by weight.

5. A method as defined by claim 1 wherein from about 1 to about 10 volumes of water is injected for each volume of treating agent injected.

6. A method as defined by claim 1 wherein said treating agent is substantially anhydrous acetic acid.

7. A method as defined by claim 1 wherein said water contains about 3 percent sodium chloride.

8. A method for treating a subterranean carbonate formation penetrataed by a wellbore which comprises injecting into said formation a treating agent consisting essentially of a substantially anhydrous aliphatic carboxylic acid containing from 2 to about 6 carbon atoms per molecule, said treating agent being injected in a volume sufficient to penetrate a substantial distance into said formation, and thereafter injecting water into said formation behind said treating agent.

9. A method as defined by claim 8 wherein said acid is acetic acid.

10. A method as defined by claim 8 wherein said acid is propionic acid.

11. A method for treating a subterranean carbonate formation surrounding a wellbore which comprises injecting into said formation a treating agent consisting essentially of an anhydride of an aliphataic carboxylic acid containing from 2 to about 6 carbon atoms per molecule, said treating agent being injected in a volume sufficient to penetrate a substantial distance into said formation, and thereafter injecting water into said formation behind said treating agent.

12. A method as defined by claim 11 wherein said treating agent is acetic anhydride.

13. A method for treating a subterranean carbonate formation surrounding a wellbore which comprises injecting into said formation a treating agent consisting essentially of an aqueous solution of an aliphatic carboxylic acid containing from 2 to about 6 carbon atoms per molecule with a concentration in excess of about 50 percent by weight, said treating agent being injected in a volume sufficient to penetratae a substantial distance into said formation, and thereafter injecting water into said formation behind said treating agent.

14. A method as defined by claim 13 wherein said solution is an acetic acid solution having a concentration in excess of about 85 percent by weight.

15. A method as defined by claim 13 wherein said solution is a propionic acid solution.

16. A method for treating a subterranean carbonate formation surrounding a wellbore which comprises injecting into said formation a treating agent consisting essentially of a mixture of substantially anhydrous acetic acid and acetic anhydride, said treating agent being injected in a volume sufficient to penetrate a substantial distance into said formation, and thereafter injecting water into said formation behind said treating agent.

(References on following page)

References Cited

UNITED STATES PATENTS

| | | | |
|---|---|---|---|
| 2,681,889 | 6/1954 | Menaul et al. | 166—42 X |
| 2,863,832 | 12/1958 | Perrine | 252—8.55 |
| 2,910,436 | 10/1959 | Fatt et al. | 166—42 X |
| 3,070,164 | 12/1962 | Gordon | 166—42 X |
| 3,142,335 | 7/1964 | Dill et al. | 166—42 X |
| 3,251,415 | 5/1966 | Bombardieri et al. | 166—42 |
| 3,335,793 | 8/1967 | Biles et al. | 166—42 X |
| 3,354,957 | 11/1967 | Every et al. | 252—8.55 |

STEPHEN J. NOVOSAD, *Primary Examiner.*